United States Patent
Gibson et al.

(10) Patent No.: US 10,334,073 B2
(45) Date of Patent: *Jun. 25, 2019

(54) METHODS AND SYSTEMS FOR SESSION CLUSTERING BASED ON USER EXPERIENCE, BEHAVIOR, AND INTERACTIONS

(71) Applicant: Spotify AB, Stockholm (SE)

(72) Inventors: Clay Gibson, New York, NY (US); Will Shapiro, New York, NY (US); Santiago Gil, Portland, OR (US); Ian Anderson, New York, NY (US); Margreth Mpossi, Stamford, CT (US); Oguz Semerci, New York, NY (US); Scott Wolf, Brooklyn, NY (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,391

(22) Filed: Aug. 21, 2017

(65) Prior Publication Data
US 2018/0248976 A1    Aug. 30, 2018

Related U.S. Application Data

(63) Continuation of application No. 15/442,587, filed on Feb. 24, 2017, now Pat. No. 9,742,871.

(51) Int. Cl.
*H04L 29/08* (2006.01)
*G06N 20/00* (2019.01)

(52) U.S. Cl.
CPC ........... *H04L 67/327* (2013.01); *G06N 20/00* (2019.01); *H04L 67/142* (2013.01); *H04L 67/22* (2013.01)

(58) Field of Classification Search
CPC .................... H04L 67/327; H04L 67/142
See application file for complete search history.

(56) References Cited

U.S. PATENT DOCUMENTS

| | | | |
|---|---|---|---|
| 6,968,511 B1 * | 11/2005 | Robertson | G06F 3/048 715/205 |
| 2002/0078447 A1 | 6/2002 | Mizutome et al. | |
| 2010/0010986 A1 | 1/2010 | Icho et al. | |
| 2010/0287588 A1 | 11/2010 | Cox et al. | |
| 2012/0254388 A1 * | 10/2012 | Duxbury | H04L 43/026 709/223 |

(Continued)

OTHER PUBLICATIONS

Spotify AB, Extended European Search Report, EP18158182.8, dated Jun. 6, 2018, 8 pgs.

(Continued)

*Primary Examiner* — Arvin Eskandarnia
(74) *Attorney, Agent, or Firm* — Morgan, Lewis & Bockius LLP

(57) ABSTRACT

A server system divides respective groups of a plurality of groups of sessions for multiple users of the media-providing service into respective pluralities of clusters. The server system tracks user interaction with a client device during a user session and identifies the user session as belonging to a first cluster of the pluralities of clusters based at least in part on the user interaction. The server system personalizes content for the user session using one or more content criteria associated with the first cluster, in accordance with identifying that the user session belongs to the first cluster.

23 Claims, 6 Drawing Sheets

(56) References Cited

U.S. PATENT DOCUMENTS

| | | |
|---|---|---|
| 2014/0189525 A1 | 7/2014 | Trevisiol et al. |
| 2014/0237114 A1* | 8/2014 | Lin ...................... H04L 41/042 709/224 |
| 2015/0088878 A1 | 3/2015 | Billinski et al. |
| 2015/0206441 A1 | 7/2015 | Brown |
| 2015/0301795 A1* | 10/2015 | Lebrun ................ G06F 17/279 704/9 |
| 2016/0063376 A1 | 3/2016 | Chen et al. |
| 2016/0253681 A1* | 9/2016 | de Souza ........... G06Q 30/0201 |
| 2017/0031920 A1 | 2/2017 | Manning et al. |
| 2017/0124074 A1 | 5/2017 | Cama et al. |

OTHER PUBLICATIONS

Gibson, Notice of Allowance, U.S. Appl. No. 15/831,302, dated Feb. 21, 2018, 11 pgs.

Gibson, Notice of Allowance, U.S. Appl. No. 15/442,587, dated Jul. 7, 2017, 9 pgs.

Gibson, Notice of Allowance, U.S. Appl. No. 15/948,211, dated Jul. 27, 2018, 8 pgs.

\* cited by examiner

METHODS AND SYSTEMS FOR SESSION CLUSTERING BASED ON USER EXPERIENCE, BEHAVIOR, AND INTERACTIONS

RELATED FIELD

This application is a continuation of U.S. Non-Provisional application Ser. No. 15/442,587, filed Feb. 24, 2017, entitled "Methods and Systems for Session Clustering Based on User Experience, Behavior, and Interactions," which is incorporated by reference in its entirety.

TECHNICAL FIELD

The disclosed implementations relate generally to media playback, and, in particular, to personalizing media content based on user interaction.

BACKGROUND

Access to electronic media, such as music and video content, has expanded dramatically over time. As a departure from physical media, media content providers stream media to electronic devices across wireless networks, improving the convenience with which users can digest and experience such content.

As part of the service they provide and to assist users in discovering new content, media content providers track and process user data in an attempt to understand user preferences, and ultimately to provide relevant content personalization. Media content providers often fail to identify patterns of user interaction that account for both context and listening behavior, where, for example, a same behavior could indicate different meanings in different contexts.

SUMMARY

Accordingly, there is a need for systems and methods for personalizing media content based at least in part on user interaction. By identifying clusters of sessions, using a machine-learning algorithm to process context and/or listening behavior, user interaction is associated with the clusters to allow content providers to personalize content based on user interaction. Such systems and methods optionally complement or replace conventional methods for providing media recommendations.

In accordance with some implementations, a method is performed at a server system (e.g., a media content provider) having one or more processors and memory storing instructions for execution by the one or more processors. The server system is associated with a media-providing service. The method includes sorting a plurality of sessions for multiple users of the media-providing service into a plurality of groups, which includes applying one or more sorting rules to one or more session characteristics for the plurality of sessions. Respective groups of the plurality of groups are divided into respective pluralities of clusters using a machine-learning algorithm. The server system tracks user interaction with a client device during a user session. The server system identifies the user session as belonging to a first cluster of the pluralities of clusters based at least in part on the user interaction. In accordance with identifying that the user session belongs to the first cluster, the server system personalizes content for the user session using one or more content criteria associated with the first cluster.

In accordance with some implementations, a server system includes one or more processors and memory storing one or more programs configured to be executed by the one or more processors. The one or more programs include instructions for performing the operations of the method described above. In accordance with some implementations, a non-transitory computer-readable storage medium has stored therein instructions that, when executed by the server system, cause the server system to perform the operations of the method described above.

Thus, systems are provided with effective methods for personalizing content for users of a content service.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings and specification.

DETAILED DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are used only to distinguish one element from another. For example, a first media item could be termed a second media item, and, similarly, a second media item could be termed a first media item, without departing from the scope of the various described implementations. The first media item and the second media item are both media items, but they are not the same media item.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising,"

when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
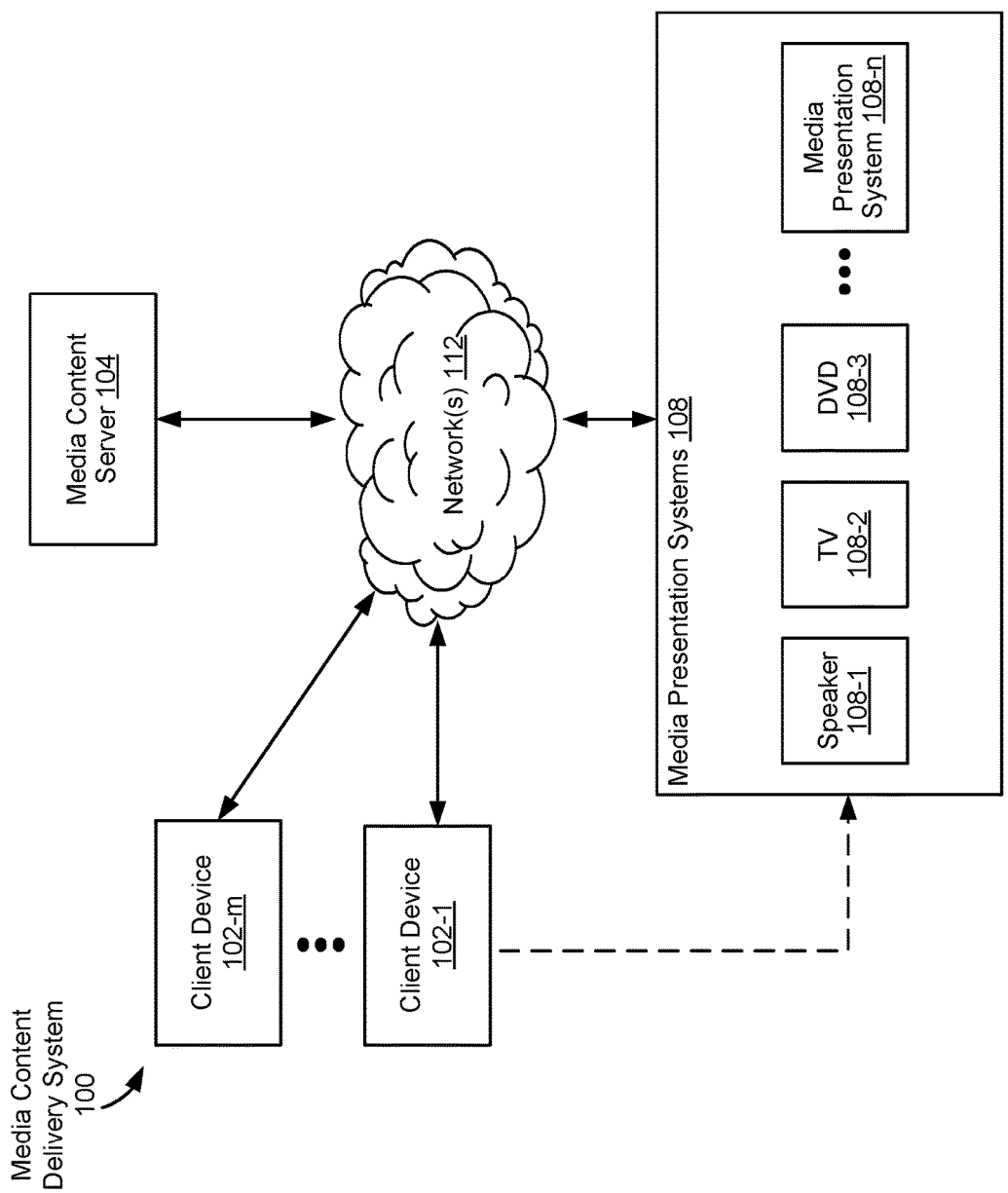
FIG. 1 is a block diagram illustrating a media content delivery system in accordance with some implementations.

FIG. 1 is a block diagram illustrating a media content delivery system 100 in accordance with some implementations. The media content delivery system 100 includes one or more client devices 102 (e.g., client device 102-1 to client device 102-*m*, where m is an integer greater than one), one or more media content servers 104, and one or more media presentation systems 108, including speaker 108-1, television (TV) 108-2, digital versatile disk (DVD) player 108-3, and/or other media presentation system 108-*n* (where n is an integer greater than three). One or more networks 112 communicably couple the components of the media content delivery system 100. In some implementations, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some implementations, a client device 102-1 or 102-*m* is associated with one or more users. In some implementations, a client device 102 is a personal computer, mobile electronic device, wearable computing device, laptop computer, tablet computer, mobile phone, feature phone, smart phone, digital media player, or any other electronic device capable of presenting media content (e.g., controlling playback of media items, such as music tracks, videos, etc.). A client device 102 may connect to a media presentation system 108 wirelessly or through a wired connection (e.g., directly through an interface, such as an HDMI interface). In some implementations, a client device 102 is a headless client. In some implementations, client devices 102-1 and 102-*m* are the same type of device (e.g., client device 102-1 and client device 102-*m* are both mobile devices). Alternatively, client device 102-1 and client device 102-*m* are different types of devices.

In some implementations, client devices 102-1 and 102-*m* send and receive media-control information through the networks 112. For example, client devices 102-1 and 102-*m* send media control requests (e.g., requests to play music, movies, videos, or other media items, or playlists thereof) to media content server 104 through network(s) 112. Additionally, client devices 102-1 and 102-*m*, in some implementations, also receive authentication tokens from the media content server 104 through network(s) 112.

In some implementations, client device 102-1 communicates directly with media presentation systems 108. As pictured in FIG. 1, client device 102-1 is able to communicate directly (e.g., through a wired connection or through a short-range wireless signal, such as those associated with personal-area-network (e.g., BLUETOOTH/BLE) communication technologies, radio-frequency-based near-field communication technologies, infrared communication technologies, etc.) with media presentation systems 108, while client device 102-*m* communicates with the media presentation systems 108 through network(s) 112. In some implementations, client device 102-1 uses the direct connection with media presentation systems 108 to stream content (e.g., data for media items) for playback on the media presentation systems 108.

In some implementations, client device 102-1 and client device 102-*m* each include a media application 222 (FIG. 2) that allows a user of the client device to browse, request (e.g., for playback at the client device 102 and/or a media presentation system 108), and/or present media content (e.g., control playback of music tracks, videos, etc.). Media content may be stored locally (e.g., in memory 212 of the client device 102, FIG. 2) and/or received in a data stream (e.g., from the media content server 104). The media presentation system 108 may be part of the client device 102, such as built-in speakers and/or a screen, or may be separate from the client device 102, such as a wirelessly coupled speaker (e.g., speaker 108-1).

In some implementations, the media content server 104 stores and provides media content (also referred to as media items) (e.g., media content requested by the media application 222 of client device 102-1 and/or 102-*m*) to client devices 102 and/or media presentation systems 108 via the network(s) 112. Content stored and served by the media content server 104, in some implementations, includes any appropriate content, including audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. In some implementations, the media content server 104 is implemented by multiple computing devices working together to perform the actions of a server system (e.g., cloud computing).

As described above, media presentation systems 108 (e.g., speaker 108-1, TV 108-2, DVD 108-3, media presentation system 108-*n*) are capable of receiving media content (e.g., from the media content server 104) and presenting the received media content. For example, speaker 108-1 may be a component of a network-connected audio/video system (e.g., a home entertainment system, a radio/alarm clock with a digital display, or an infotainment system of a vehicle). In some implementations, the media content server 104 sends media content to the media presentation systems 108. For example, media presentation systems 108 include computers, dedicated media players, network-connected stereo and/or speaker systems, network-connected vehicle media systems, network-connected televisions, network-connected DVD players, and universal serial bus (USB) devices used to provide a playback device with network connectivity, and the like.

Figure 2:
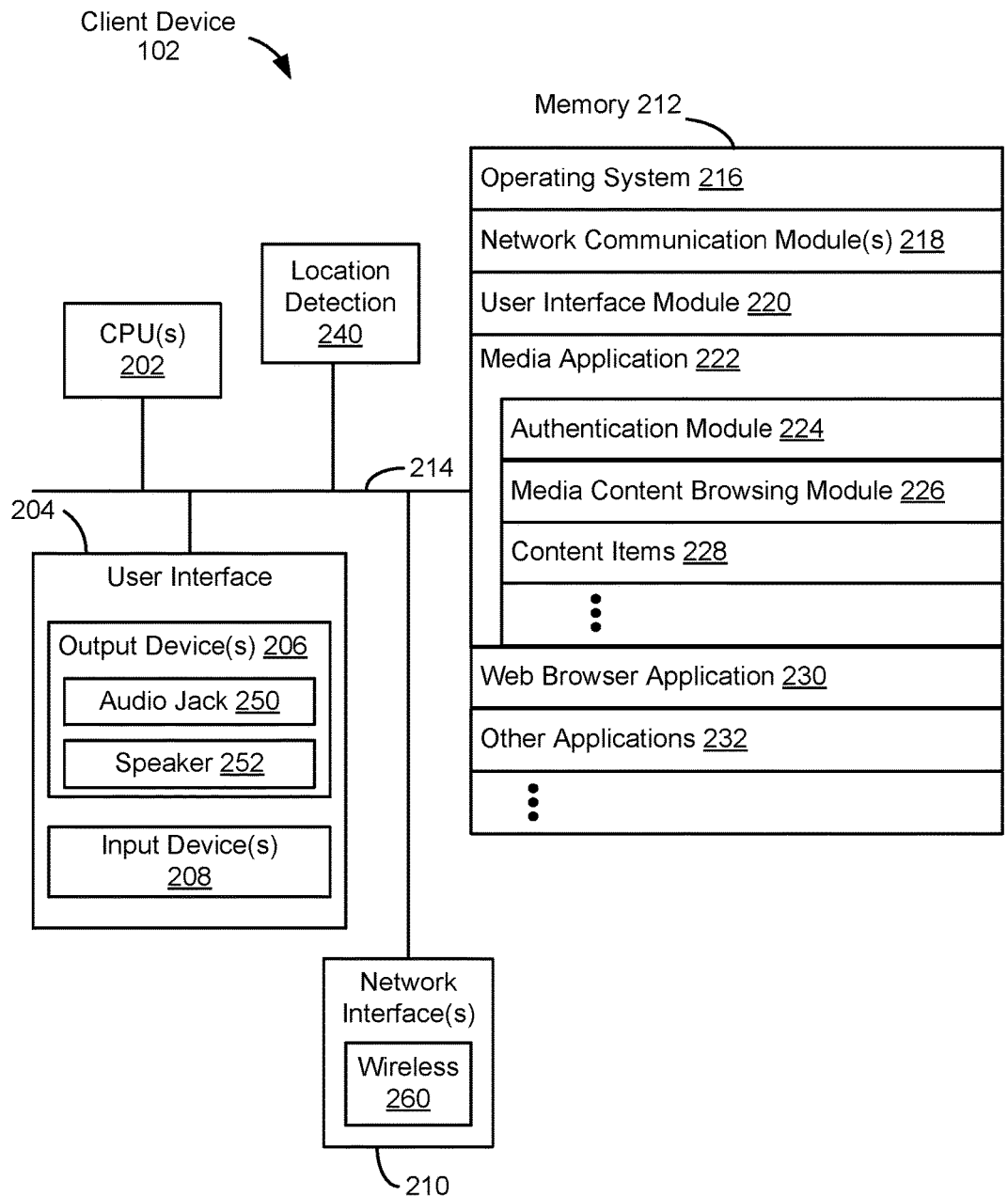
FIG. 2 is a block diagram illustrating a client device in accordance with some implementations.

FIG. 2 is a block diagram illustrating a client device 102 (e.g., client device 102-1 and/or client device 102-*m*, FIG. 1) in accordance with some implementations. The client device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

As also shown in FIG. 2, the client device 102 includes a user interface 204, including output device(s) 206 and input device(s) 208. In some implementations, the input devices 208 include a keyboard, mouse, or track pad. Alternatively, or in addition, in some implementations, the user interface 204 includes a display device that includes a touch-sensitive surface, in which case the display device is a touch-sensitive display. In client devices that have a touch-sensitive display, a physical keyboard is optional (e.g., a soft keyboard may be displayed when keyboard entry is needed). The output devices (e.g., output device(s) 206) include a speaker 252 (e.g., speakerphone device) and/or an audio jack 250 (or other physical output connection port) for connecting to speakers, earphones, headphones, or other external listening devices. Furthermore, some client devices 102 use a microphone and voice recognition device to supplement or replace the keyboard. Optionally, the client device 102 includes an audio input device (e.g., a microphone) to capture audio (e.g., speech from a user).

Optionally, the client device 102 includes a location-detection device 240, such as a global navigation satellite system (GNSS) (e.g., GPS (global positioning system), GLONASS, Galileo, BeiDou) or other geo-location receiver, and/or location-detection software for determining the location of the client device 102 (e.g., module for finding a position of the client device 102 using trilateration of measured signal strengths for nearby devices).

In some implementations, the one or more network interfaces 210 include wireless and/or wired interfaces for receiving data from and/or transmitting data to other client devices 102, media presentations systems 108, a media content server 104, and/or other devices or systems. In some implementations, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some implementations, data communications are carried out using any of a variety of custom or standard wired protocols (e.g., USB, Firewire, Ethernet, etc.). For example, the one or more network interfaces 210 include a wireless interface 260 for enabling wireless data communications with other client devices 102, media presentations systems 108, and/or or other wireless (e.g., Bluetooth-compatible) devices (e.g., for streaming audio data to the media presentations system 108 of an automobile). Furthermore, in some implementations, the wireless interface 260 (or a different communications interface of the one or more network interfaces 210) enables data communications with other WLAN-compatible devices (e.g., a media presentations system 108) and/or the media content server 104 (via the one or more network(s) 112, FIG. 1).

In some implementations, client device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some implementations, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation systems 108, media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application associated with and for accessing a content (i.e., media-providing) service provided by a media content provider such as media content server 104, including a media player, a streaming media application, or any other appropriate application or component of an application) for browsing, receiving, processing, presenting, and requesting playback of media (e.g., media items). The media application 222 is also used to monitor, store, and/or transmit (e.g., to media content server 104) data associated with user behavior, both explicit (e.g., explicit user inputs to the media application 222 for controlling playback of or providing feedback for media items) and implicit (e.g., behavior implicitly corresponding to media-item playback, which excludes explicit user behavior such as user inputs for controlling media-item playback). The media application 222 may include a model (e.g., provided by the media content server 104) for identifying which of a plurality of session clusters corresponds to a session on the client device and/or for personalizing content in accordance with the identified cluster. The media application 222 also includes the following modules (or sets of instructions), or a subset or superset thereof:
  - an authentication module 224 for sending authentication tokens corresponding to one or more media presentation systems associated with the client device 102 (e.g., one or more of the media presentation systems 108 from FIG. 1), receiving authentication tokens from other devices, and/or generating authentication tokens for media presentation systems associated with client device 102;

a media content browsing module 226 for providing controls and/or user interfaces enabling a user to navigate, select for playback, and otherwise control or interact with media content, whether the media content is stored or played locally or remotely;

a content items module 228 storing media items for playback;

a web browser application 230 (e.g., Internet Explorer or Edge by Microsoft, Firefox by Mozilla, Safari by Apple, or Chrome by Google) for accessing, viewing, and interacting with web sites; and other applications 232, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some implementations, the media presentation system 108 is a type of client device 102, and includes some or all of the same components, modules, and sub-modules as described above in FIG. 2 with respect to the client device 102.

Figure 3:
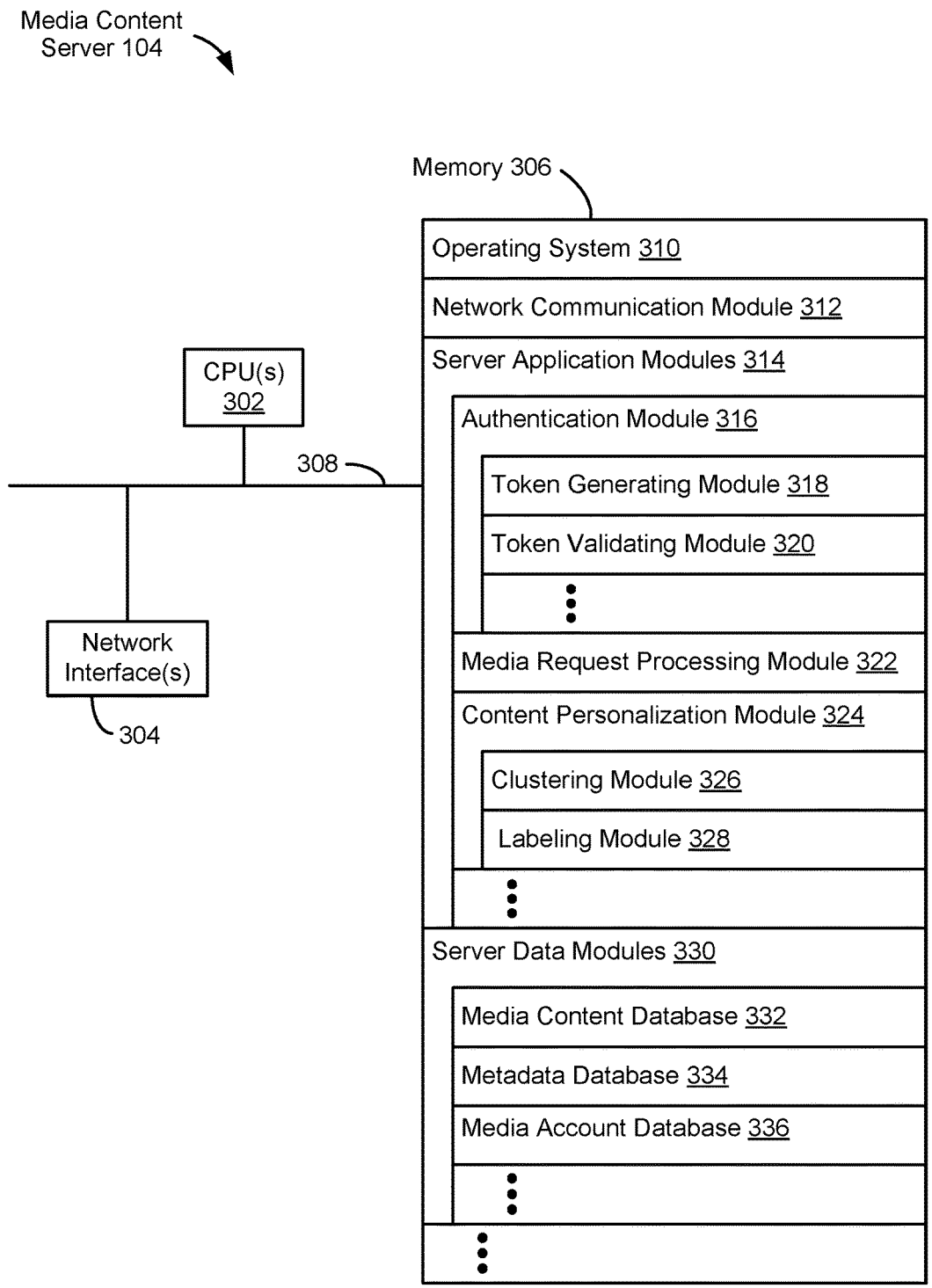
FIG. 3 is a block diagram illustrating a media content server in accordance with some implementations.

FIG. 3 is a block diagram illustrating a media content server 104 in accordance with some implementations. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some implementations, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

an authentication module 316 for managing authentication and/or authorization requests, the authentication module 316 including, but not limited to, one or more of:

a token generating module 318 for generating authentication tokens permitting use of media presentation systems 108; and a token validating module 320 for verifying that an authentication token is valid (e.g., has not yet expired or has not yet been revoked); and a media request processing module 322 for processing requests for media content and facilitating access to requested media items by client devices (e.g., the client device 102) including, optionally, streaming media content to such devices and/or to one or more media presentation systems 108;

a content personalization module 324 for providing personalized content (e.g., advertisements, tooltips, notifications, etc.) to users of the content service, including, but not limited to, one or more of:

a clustering module 326 for using, processing (e.g., sorting a plurality of sessions into groups, dividing respective groups into respective pluralities of clusters, identifying a user session as belonging to a first cluster), and storing data (e.g., clusters) associated with a plurality of sessions for personalizing content; and a labeling module 328 for assigning labels to one or more clusters (e.g., labels corresponding to one or more content criteria, such as "high tilt" or "low tilt");

one or more server data module(s) 330 for handling the storage of and access to media items and metadata relating to the media items; in some implementations, the one or more server data module(s) 330 include:

a media content database 332 for storing media items (e.g., audio files, video files, text files, etc.);

a metadata database 334 for storing metadata relating to the media items; and a media account database 336 for storing account information for user media accounts, including user profiles, credentials (e.g., user identifiers, passwords, email addresses, etc.), credentials or identifiers of any linked accounts, and the like.

In some implementations, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some implementations, FIG. 3 is intended more as a functional description of the various features that may be present in one or more media content servers than as a structural schematic of the implementations described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the media content server 104, and how features are allocated among them, will vary from one implementation to another and, optionally, depends in part on the amount of data traffic that the server system handles during peak usage periods as well as during average usage periods.

Figure 4:
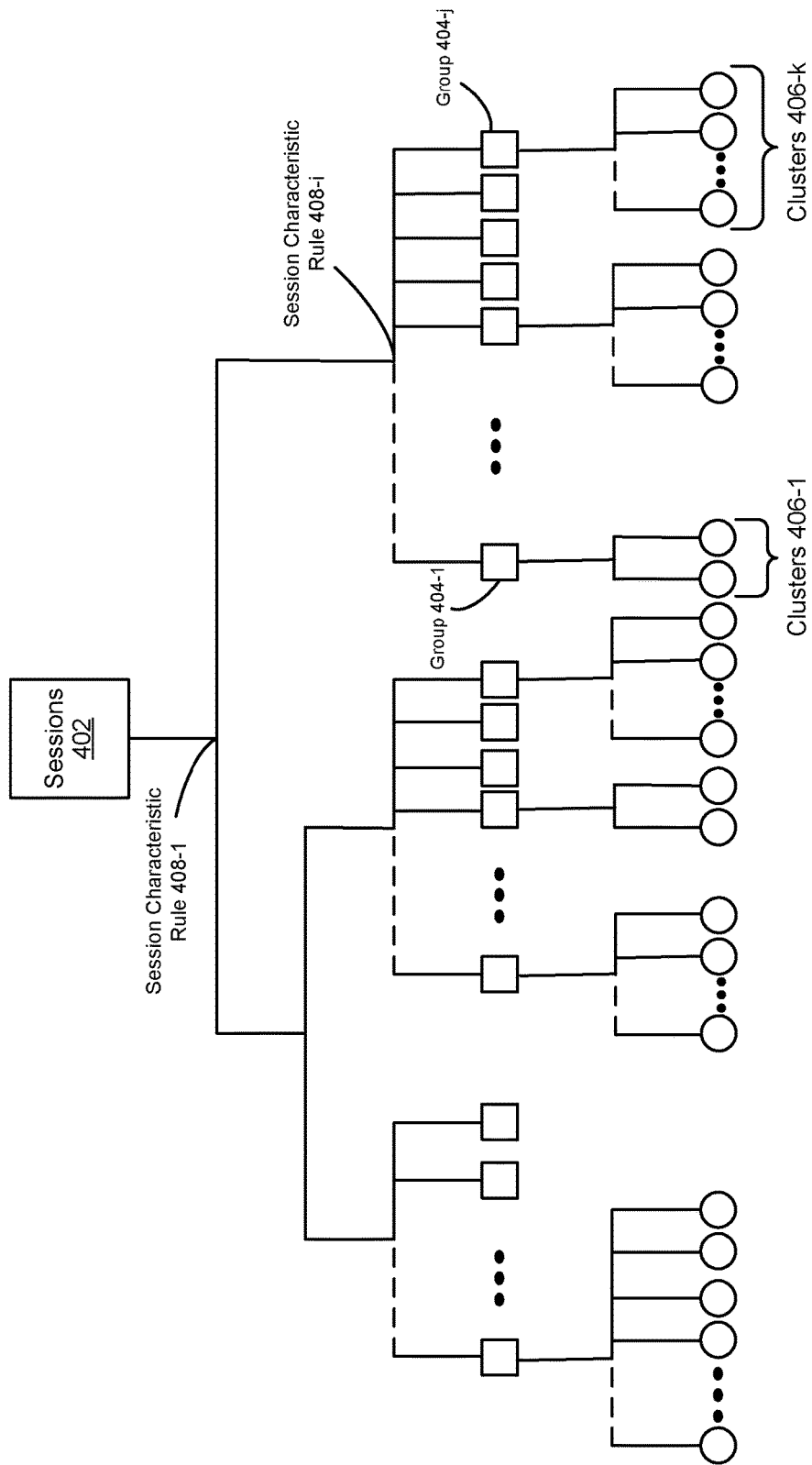
FIG. 4 is a block diagram illustrating groups and clusters in accordance with some implementations.

FIG. 4 illustrates the sorting of sessions 402 for multiple users of the media-providing service. One or more sorting rules (e.g., business rules) are applied to one or more session characteristics for the sessions. As an example (referring to FIG. 1), a session of the media-providing service may include the client device 102-1 using the media-providing service to request media (e.g., sending one or more requests for a music track to the media content server 104) and control playback of the media, either at the client device 102-1 or at a media presentation system 108. The media content server 104 processes the request and stores session characteristics (e.g., account type, shuffle mode, playback mode, etc.) for the session. A single session may involve a single request or multiple requests. In general, a session corresponds to a single period or episode of use of the media-providing service by a user. The server system (e.g., media content server 104) collects session characteristics from a plurality of sessions for multiple users (e.g., server system 104 stores session characteristics in the media account database 336, FIG. 3).

In some embodiments, sessions 402 are sorted based on the user account type (e.g., premium account or free account). In addition to (e.g., after or simultaneously with) applying the first session characteristic rule, subsequent session characteristic rules may be applied. For example, sessions having a first user account type (e.g., premium account) are sorted based on one or more other session characteristics (e.g., whether shuffle mode is turned on or off). Likewise, sessions having a second user account type (e.g., free account) may be sorted based on the one or more other session characteristics (e.g., whether shuffle mode is turned on or off). The session characteristic rules may be applied in different orders, or may be applied simultaneously. For example, whether shuffle mode is enabled or disabled could be the first session characteristic rule applied (e.g., instead of the user account type). In some embodiments, after applying the first session characteristic rule, subsequent session characteristic rules can be applied to a subset of the sessions. For example, subsequent to applying an account-type rule (e.g., whether accounts are premium or free), the shuffle-mode-enabled-or-disabled session characteristic rule may only be applied to sessions having the premium account type (e.g., not applied to sessions having the free account type). In some embodiments, the same session characteristic rules are applied to all sessions.

In some embodiments, the one or more session characteristics include whether content is skipped during a session (e.g., if the user selects a forward button before completion of a song), whether a session has satisfied (e.g., exceeded, or equaled or exceeded) a skip-count threshold (e.g., the number of times content is skipped during the session), and/or whether a session has satisfied (e.g., exceeded, or equaled or exceeded) a skip-rate threshold (e.g., the rate at which content is skipped over a certain time period). Sessions in which content is skipped thus may be grouped separately from sessions in which content is not skipped. Likewise, sessions in which the skip-count threshold and/or skip-rate threshold are satisfied may be grouped separately from sessions in which the skip-count threshold and/or skip-rate threshold are not satisfied. The skip-rate threshold can be defined by (i.e., determined for) a time period (e.g., 1 minute, 2 minutes, 10 minutes, 1 hour or the length of the session), in accordance with some embodiments. Business rules based on the skip-count threshold and/or skip-rate threshold may be used to sort sessions.

In some embodiments, the one or more session characteristics include a mode of playback. The mode of playback may include the source within the music-providing service of selected content for the session (e.g., through an artist, album, user-defined playlist, playlist created by the music-providing service, streaming radio station, etc.). The mode of playback may alternatively or additionally include whether a user is in an online mode (e.g., streaming content) or an offline mode (e.g., content has been pre-downloaded or saved to the client device or media presentation system and is played back from the memory of the client device or media presentation system).

As a result of applying i (where i is an integer) session characteristic rules 408 (e.g., session characteristic rule 408-1 to session characteristic rule 408-i), the sessions (e.g., a subset of the sessions) are sorted into j (where j is an integer) groups 404 (e.g., group 404-1 to 404-j). Respective groups are divided into respective pluralities of clusters (e.g., group 404-1 is divided into a plurality of clusters 406-1; group 404-j is divided into a plurality of clusters 406-k, FIG. 4) using a machine learning algorithm (e.g., K-means algorithm, Gaussian Mixture Model, etc.). In some embodiments, the number of clusters in a plurality of clusters is predefined (e.g., k clusters, where k is an integer). In some embodiments, each group is divided into a plurality of clusters. In some embodiments, a subset of groups is divided into pluralities of clusters. In some embodiments, respective groups are divided into respective pluralities of clusters with a same number of clusters in each plurality of clusters (i.e., each plurality of clusters has the same number of clusters). In some embodiments, the number of clusters in each plurality of clusters is not the same.

In some embodiments, after the initial clustering, the clusters are re-divided (e.g., re-clustered) using the machine learning algorithm. For example, re-dividing the clusters (i.e., re-clustering) is performed in accordance with a determination that a new source of content (e.g., a new playlist, streaming radio station, artist, album, etc.) has been added (e.g., made available) by the media-providing service. In some embodiments, re-dividing the clusters is performed after a predefined amount of time (e.g., after one day, one month, one year, etc.). In some embodiments, re-dividing the clusters includes re-sorting the plurality of sessions into groups using one or more sorting rules (e.g., using different sorting rules than were originally used), applying the sorting rules in a different order, and/or using one or more additional sorting rules beyond the sorting rules that were originally used).

Figure 5A:
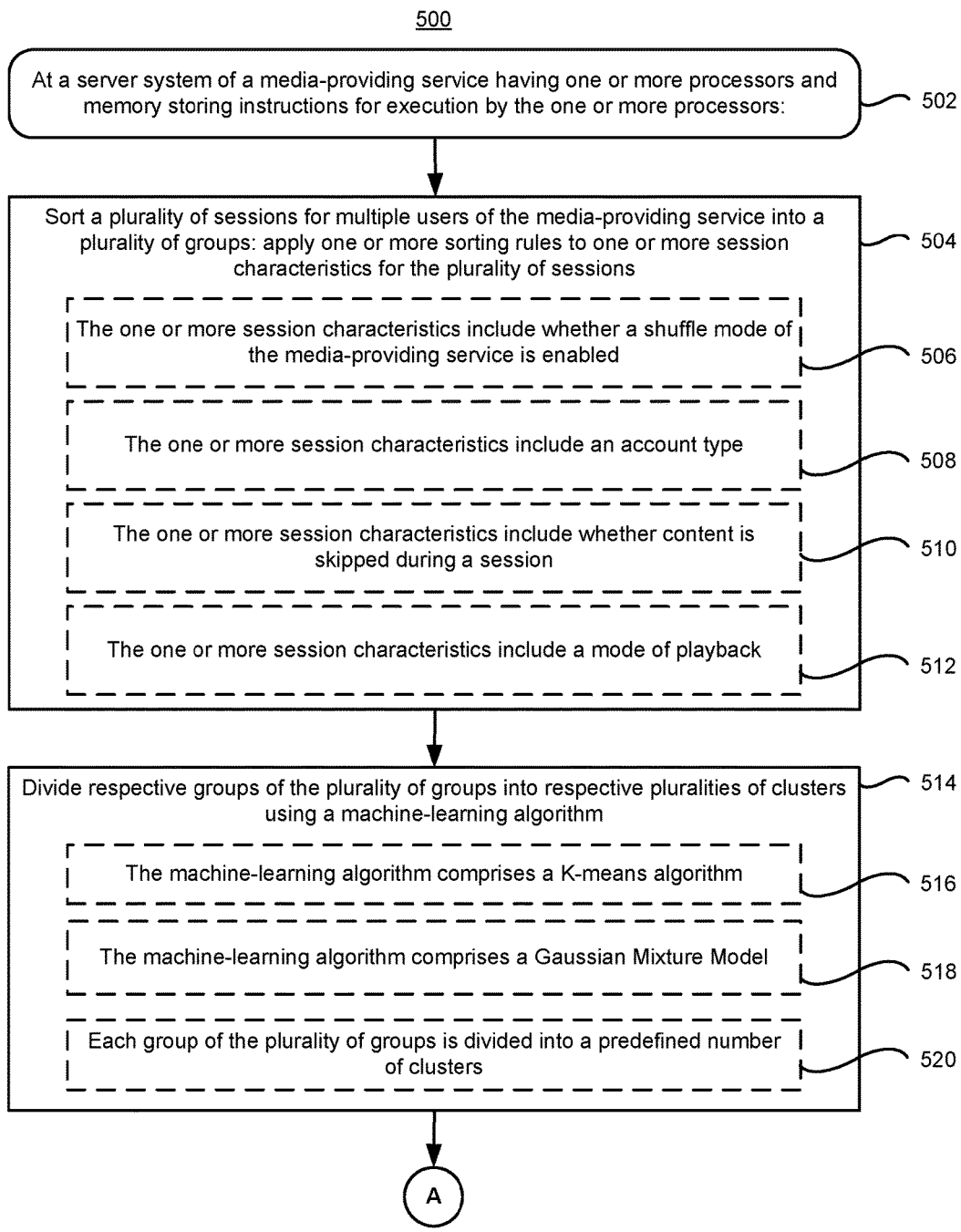
FIGS. 5A-5B are flow diagrams illustrating methods for personalizing content in accordance with some implementations.
Figure 5B:
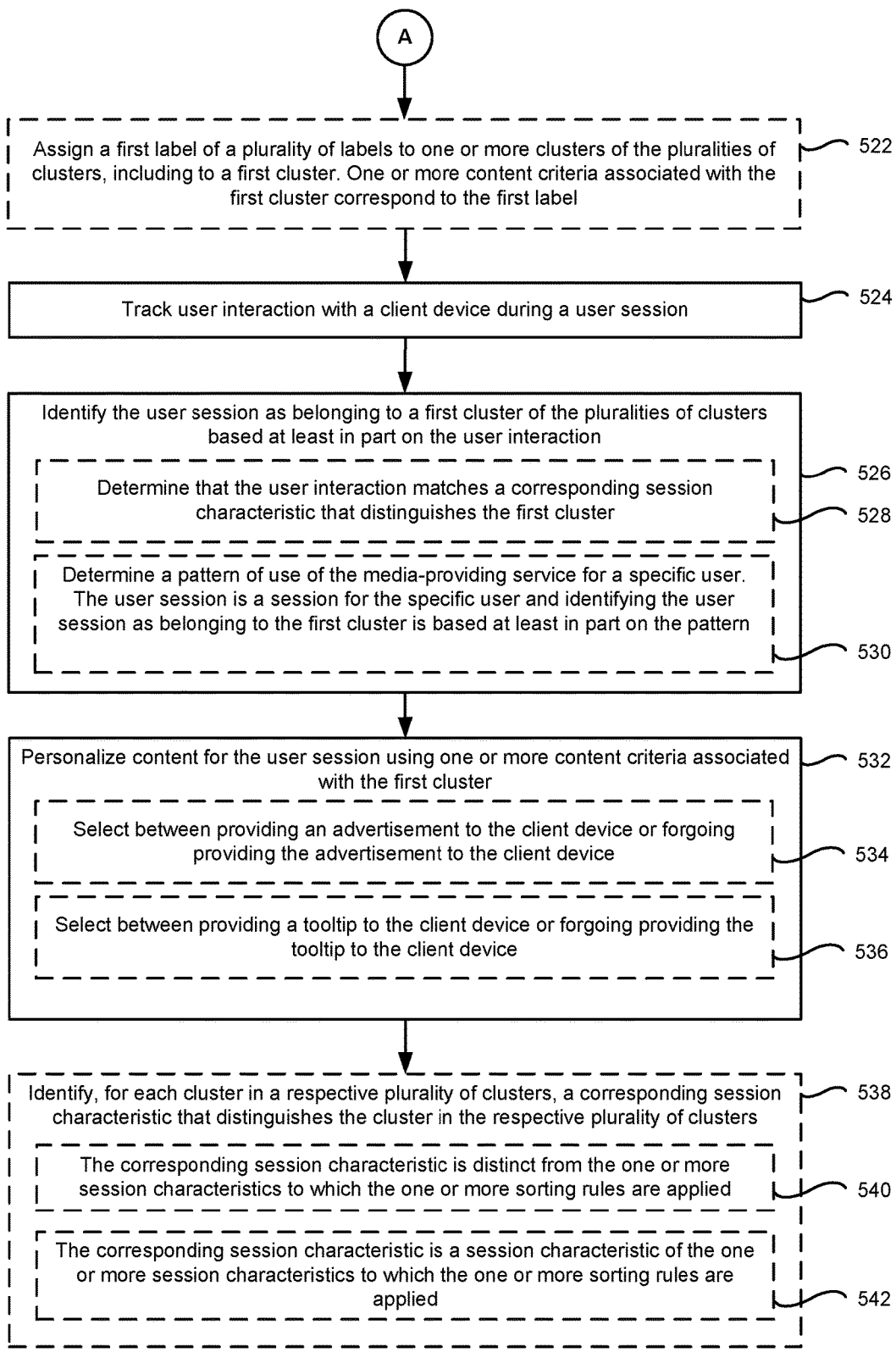

FIGS. 5A-5B are flow diagrams illustrating a method 500 for personalizing content for a user session based on cluster data from multiple users (e.g., users of the media-providing service), in accordance with some implementations. Method 500 may be performed (502) at a server system (e.g., media content server 104, FIGS. 1 and 3) having one or more processors and memory storing instructions for execution by the one or more processors. The server system is associated with a media-providing service, (e.g., provides media content for playback to client devices 102 and/or media presentation systems 108 in a media content delivery system 100). In some implementations, the method 500 is performed by executing instructions stored in the memory of a server system (e.g., in memory 306, FIG. 3). In some implementations, the method 500 is performed by a combination of the server system and a client device (e.g., operations 526 and/or 532 may be performed by the client device using a model and/or instructions provided by the server system).

The method 500 describes various implementations in which clusters of sessions can be determined and associated with user behavior during a user session to personalize content for the user session. In supporting a media-providing service, the server system provides media items for playback to client devices 102 and/or media presentation systems 108 of the media content delivery system 100. By identifying user interactions that correspond to a cluster, based on context and/or listening behavior across multiple users, content service providers can infer when a user is active, inactive (e.g., low tilt, lean-back behavior), or neutral. Sessions in which the user is active (e.g., interacts frequently with the media-providing service) may be referred to as high-tilt sessions, and the corresponding user behavior may be referred to as lean-in behavior. Sessions in which the user in inactive (e.g., interacts infrequently with the media-providing service, for example not at all after the session begins) may be referred to as low-tilt sessions, and the corresponding user behavior may be referred to as lean-back behavior The content providers may therefore personalize content more likely to align with user preferences.

Referring now to FIG. 5A, in performing the method 500, the server system sorts (504) a plurality of sessions for multiple users of the media-providing service into a plurality of groups. This sorting includes applying one or more sorting rules (e.g., business rules) to one or more session characteristics that may include context (e.g., account type, time of the session) and listening behavior (e.g., percentage of time a session is active in the foreground of the client device as opposed to running in the background, type of source used) for the plurality of sessions. Applying the one or more sorting rules to the plurality of sessions is described above with reference to FIG. 4. The one or more sorting rules may be applied to sort session 402 into groups 404 (FIG. 4).

In some embodiments, the session characteristics include whether a shuffle mode of the media-providing service is enabled (506). Sessions for which shuffle mode is enabled may thus be grouped separately from sessions in which shuffle mode is disabled. In some embodiments, the one or more session characteristics include an account type (508) (e.g., free account, premium account, student account, etc.). Sessions with different account types may thus be grouped separately. In some embodiments, the one or more session characteristics include whether content is skipped during a session (510). Sessions in which content is skipped (or skipped at least a threshold number of times) may thus be grouped separately from sessions in which content is not skipped (or not skipped at least the threshold number of times). In some embodiments, the one or more session characteristics include a mode of playback (512) (e.g., use of a specific source; online or offline mode, etc.). Sessions with different modes of playback may thus be grouped separately. For example, a group may consist of sessions that include the following session characteristics: premium account type, shuffle enabled, and online playback mode. A second group may include the session characteristics premium account type, shuffle disabled, and online playback mode. Additional groups may include additional permutations of those session characteristics.

The server system divides (514) respective groups of the plurality of groups into respective pluralities of clusters using a machine-learning algorithm, as explained above with reference to FIG. 4. For example, group 404-1 is divided in a plurality of clusters 406-1 and group 404-j is divided into a plurality of clusters 406-k. In some embodiments, the machine-learning algorithm comprises a K-means algorithm (516). In some embodiments, the machine-learning algorithm comprises a Gaussian Mixture Model (518). In some embodiments, each group of the plurality of groups is divided into a predefined number of clusters (520). In some embodiments, the machine-learning algorithm normalizes (e.g., scales) the one or more session characteristics, so that multiple characteristics can be analyzed on an even scale. In some embodiments, the machine-learning algorithm uses a similarity metric that takes one or more session characteristics as input.

In some embodiments, the machine-learning algorithm clusters the sessions and identifies distinguishing session characteristics for respective sessions. For example, a K-means algorithm can identify one or more centroids that are centers of the clusters of sessions. A centroid may be used to identify one or more distinguishing characteristics of a cluster. In some embodiments, the machine-learning algorithm can identify correlations (e.g., similarities) between characteristics across sessions (e.g., create a correlation matrix). For example, the machine-learning algorithm may determine that sessions that use shuffle mode (e.g., a first session characteristic) also tend to not skip content (e.g., a second session characteristic). Thus, the machine-learning algorithm may determine that shuffle mode is a distinguishing characteristic that is indicative of other session characteristics (e.g., not skipping content). When a user session is tracked, it need not match all session characteristics of a first cluster to be identified as belonging to the first cluster. For example, a user session can be determined to belong to the first cluster based on user interaction that is close to or correlated with the session characteristics of the first cluster.

Referring to FIG. 5B, in some embodiments, the server system assigns (522) a first label of a plurality of labels (e.g., high tilt, low tilt, neutral, etc.) to one or more clusters of the pluralities of clusters, including assigning the first label to the first cluster. One or more content criteria associated with the first cluster correspond to the first label. For example, a cluster of sessions labeled "low tilt" may correspond to sessions where the user interacted minimally with the media-providing service (e.g., keeping the service in the background, using the radio playback mode, turning shuffle mode on, not skipping content, etc.). Alternatively, a cluster of sessions labeled "high tilt" may correspond to sessions where the user interacted often with the media-providing service (e.g., skipping content often, manually searching for next content, etc.). Once a cluster has been labeled based on the one or more content criteria, the label can be used for personalizing content. For example, if a session is identified as belonging to a cluster labeled "low tilt," indicating a minimally involved user, the server system can personalize content by automatically playing a next song at the end of the user's playlist instead of ceasing playback (e.g., where content playback would otherwise stop at the end of a playlist).

The server system tracks (524) user interaction with a client device during a user session and identifies (526) the user session as belonging to a first cluster of the pluralities of clusters based at least in part on the user interaction. In some embodiments, identifying the user session as belonging to the first cluster comprises determining (528) that the user interaction matches the corresponding session characteristic that distinguishes the first cluster. In some embodiments, identifying the user session as belonging to the first cluster comprises determining that multiple characteristics of the user session are also characteristics associated with the first cluster (e.g., such that the user session is closer to the centroid of the first cluster than to the centroids of other clusters). In some embodiments, the user session is a session for a specific user and the server system determines (530) a pattern of use of the media-providing service for the specific user, wherein identifying the user session as belonging to a first cluster is based at least in part on the pattern. For example, the pattern of use could include the location of the session (e.g., determined using location detections device 240). The pattern of use could be a combination of patterns (e.g., location, time of day, playback in a car, playback over speakers or over headphones, etc.). For example, a user session at a certain time of day in the car (e.g., commuting in the morning) could correspond to a pattern of use for that specific user. The pattern can then be used to identify a user session (e.g., for the same user) as belonging to a cluster based on the session matching the pattern (e.g., another day of commuting in the morning), despite other session characteristics changing between sessions of the user.

The server system personalizes content (532) for the user session using one or more content criteria (e.g., associated with the first cluster). In some embodiments, the one or more content criteria correspond to the first label (522). For example, personalizing content for clusters labeled "high tilt" will provide different content than personalizing content for clusters labeled "low tilt." In some embodiments, personalization is based at least in part on the user's interaction matching a corresponding session characteristic that distinguishes a cluster. In some embodiments, personalization is based at least in part on a pattern of use (e.g., patterns of use explained above with reference to step 530) or a combination of two or more patterns. For example, advertisers can target ads that are more likely to be of interest to a user based on a pattern of the specific user. In some embodiments, the amount of content (e.g., number of advertisements, number of notifications, number of tooltips, etc.) presented to the user is adjusted based on the one or more content criteria. In some embodiments, personalizing the content includes predicting how interested a user is in the content based on the one or more content criteria. In some embodiments, personalizing the content for the user session comprises changing the order in which content is provided to the user. For example, the server system may change the order of upcoming songs in a playlist based on the one or more content criteria.

In some embodiments, personalizing the content for the user session comprises selecting (534) between providing an advertisement to the client device or forgoing providing the advertisement to the client device. In some embodiments, the advertisement is a video advertisement. For example, a session label of "low tilt" indicates that a user is not actively involved with content selection; thus, the server will forgo providing the advertisement during the "low tilt" session. Conversely, a session label of "high tilt" indicates that a user is actively involved with content selection; thus, the server will provide the advertisement (e.g., video advertisement) during the "high tilt" session. In some embodiments, personalizing the content for the user session comprises selecting between providing a first advertisement type or providing a second advertisement type. For example, the server system may select between an audio advertisement or a video advertisement. During a session labeled "high tilt," the server may provide a video advertisement, while during a session labeled "low tilt," the server may provide an audio advertisement because the user is not actively involved with content selection (e.g., is not interacting with the UI, and thus is less likely to watch a video advertisement).

In some embodiments, personalizing the content for the user session comprises selecting (536) between providing a tooltip (or other graphical-user-interface element) to the client device or forgoing providing the tooltip (or other graphical-user-interface element) to the client device. A tooltip is a user-interface element (e.g., a box or an animation) that displays information (e.g., instructions or tips for use) regarding an item or feature in a graphical user interface (GUI). A tooltip may appear to be displayed on top of an underlying GUI. For example, a "high tilt" session label indicates that a user is actively involved in selecting content and the server system will provide a tooltip (e.g., display text or animation with instructions or tips for using features of the media-providing service), because an active user is more likely to follow the instructions in the tooltip or learn about a feature of the media-providing service that the tooltip describes. Alternatively, for a "low tilt" session, the server system forgoes providing the tooltip because an inactive user is unlikely to follow (e.g., read) the tooltip. In some embodiments, personalizing the content for the user session comprises selecting between providing a notification to the client device or forgoing providing the notification to the client device. In some embodiments, personalizing the content for the user session comprises selecting between automatically providing a next media content to the client device or forgoing providing the next media content to the client device (e.g., selecting between automatically playing a next song or ceasing playback). In some embodiments, personalizing the content for the user session comprises selecting between enabling voice search or forgoing enabling (e.g., disabling) voice search. In some embodiments, personalizing the content for the user session comprises selecting between providing a recommendation for a session type (e.g., based on the one or more content criteria) to the client device or forgoing providing the recommendation for the session type to the client device. A session type is based on one or more session characteristics. For example, a session type could be based on the user listening to content from a particular source (e.g., a streaming radio station) in a vehicle. In some embodiments, a first session type can be considered similar to a second session type (e.g., based on a co-occurrence of a first session type and the second session type among users, based on overlapping session characteristics of the session types, etc.). For example, if session types A (e.g., listening to radio station A in a vehicle) and B (e.g., enabling shuffle mode) have a high co-occurrence for the same users, if a user session is determined to be session type A, the server system will recommend to the user to try session type B. In some embodiments, session patterns can provide insight to the user's life (e.g., if a user becomes less involved over time) and the server system can personalize content (e.g., provide the user with reminders or incentives to get the user to become more involved) or predict how a user will respond accordingly.

In some embodiments, the server system identifies (538), for each cluster in a respective plurality of clusters, a corresponding session characteristic that distinguishes the cluster in the plurality of clusters. In some embodiments, the corresponding session characteristic is distinct (540) from the one or more session characteristics to which the one or more sorting rules are applied. Alternatively, the corresponding session characteristic is a session characteristic (542) of the one or more session characteristics to which the one or more sorting rules are applied in operation 504. As explained above with reference to step 528, the server system can use the corresponding session characteristic that distinguishes the cluster to identify a user session as belonging to the first cluster in accordance with a determination that the user session includes the distinguishing session characteristic.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising
at a server system of a media-providing service having one or more processors and memory storing instructions for execution by the one or more processors:
for a plurality of groups of sessions for multiple users of the media-providing service, dividing respective groups into respective pluralities of clusters;
tracking user interaction with a client device during a user session;
identifying the user session as belonging to a first cluster of the pluralities of clusters based at least in part on the user interaction; and
in accordance with identifying that the user session belongs to the first cluster, personalizing content for the user session using one or more content criteria associated with the first cluster.

2. The method of claim 1, wherein:
the method further comprises, at the server system, sorting a plurality of sessions for the multiple users of the media-providing service into the plurality of groups of sessions, the sorting comprising applying one or more sorting rules to one or more session characteristics for the plurality of sessions.

3. The method of claim 2, wherein the one or more session characteristics include whether a shuffle mode of the media-providing service is enabled.

4. The method of claim 2, wherein the one or more session characteristics include an account type.

5. The method of claim 2, wherein the one or more session characteristics include whether content is skipped during a session.

6. The method of claim 2, wherein the one or more session characteristics include a mode of playback.

7. The method of claim 1, further comprising, at the server system, identifying, for each cluster in a respective plurality of clusters, a corresponding session characteristic that distinguishes the cluster in the respective plurality of clusters;
wherein identifying the user session as belonging to the first cluster comprises determining that the user interaction matches the corresponding session characteristic that distinguishes the first cluster.

8. The method of claim 7, further comprising, at the server system, sorting a plurality of sessions for the multiple users of the media-providing service into the plurality of groups of sessions, the sorting comprising applying one or more sorting rules to one or more session characteristics for the plurality of sessions;
wherein the corresponding session characteristic that distinguishes the first cluster is distinct from the one or more session characteristics to which the one or more sorting rules are applied.

9. The method of claim 7, further comprising, at the server system, sorting a plurality of sessions for the multiple users of the media-providing service into the plurality of groups of sessions, the sorting comprising applying one or more sorting rules to one or more session characteristics for the plurality of sessions;
wherein the corresponding session characteristic that distinguishes the first cluster is a session characteristic of the one or more session characteristics to which the one or more sorting rules are applied.

10. The method of claim 1, further comprising, at the server system, assigning a first label of a plurality of labels to one or more clusters of the pluralities of clusters, including assigning the first label to the first cluster;
wherein the one or more content criteria associated with the first cluster correspond to the first label.

11. The method of claim 1, wherein dividing the respective groups into the respective pluralities of clusters is performed using a machine-learning algorithm.

12. The method of claim 11, wherein the machine-learning algorithm comprises a K-means algorithm.

13. The method of claim 11, wherein dividing the respective groups using the machine-learning algorithm comprises dividing each group of the plurality of groups into a predefined number of clusters.

14. The method of claim 11, wherein the machine-learning algorithm comprises a Gaussian Mixture Model.

15. The method of claim 1, wherein personalizing the content for the user session comprises selecting between providing an advertisement to the client device or forgoing providing the advertisement to the client device.

16. The method of claim 1, wherein personalizing the content for the user session comprises selecting between providing a tooltip to the client device or forgoing providing the tooltip to the client device.

17. The method of claim 1, wherein personalizing the content for the user session comprises selecting between providing a notification to the client device or forgoing providing the notification to the client device.

18. The method of claim 1, wherein personalizing the content for the user session comprises selecting between automatically providing a next media content to the client device or forgoing providing the next media content to the client device.

19. The method of claim 1, wherein personalizing the content for the user session comprises selecting between enabling voice search or forgoing enabling voice search.

20. The method of claim 1, wherein personalizing the content for the user session comprises selecting between providing a recommendation for a session type to the client device or forgoing providing the recommendation for the session type to the client device.

21. The method of claim 1, wherein the user session is a session for a specific user, the method further comprising, at the server system, determining a pattern of use of the media-providing service for the specific user,
wherein identifying the user session as belonging to a first cluster is based at least in part on the pattern.

22. A server system, comprising:
one or more processors; and
memory storing one or more programs for execution by the one or more processors, the one or more programs including instructions for:
for a plurality of groups of sessions for multiple users of the media-providing service, dividing respective groups into respective pluralities of clusters;
tracking user interaction with a client device during a user session;
identifying the user session as belonging to a first cluster of the pluralities of clusters based at least in part on the user interaction; and
in accordance with identifying that the user session belongs to the first cluster, personalizing content for the user session using one or more content criteria associated with the first cluster.

23. A non-transitory computer-readable storage medium, storing one or more programs for execution by one or more processors of a server system, the one or more programs including instructions for:
for a plurality of groups of sessions for multiple users of the media-providing service, dividing respective groups into respective pluralities of clusters;
tracking user interaction with a client device during a user session;
identifying the user session as belonging to a first cluster of the pluralities of clusters based at least in part on the user interaction; and
in accordance with identifying that the user session belongs to the first cluster, personalizing content for the user session using one or more content criteria associated with the first cluster.

* * * * *